July 31, 1962  J. P. WAGNER  3,046,787
FUSION TYPE THERMAL ELEMENT
Filed Oct. 6, 1958
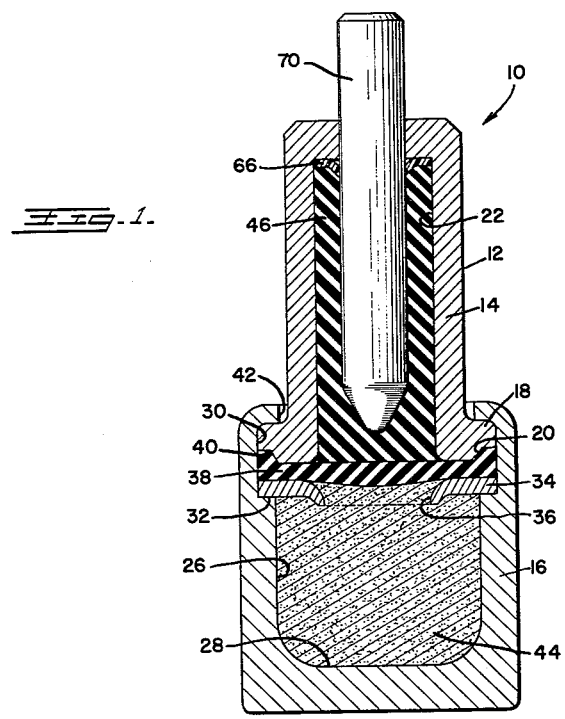
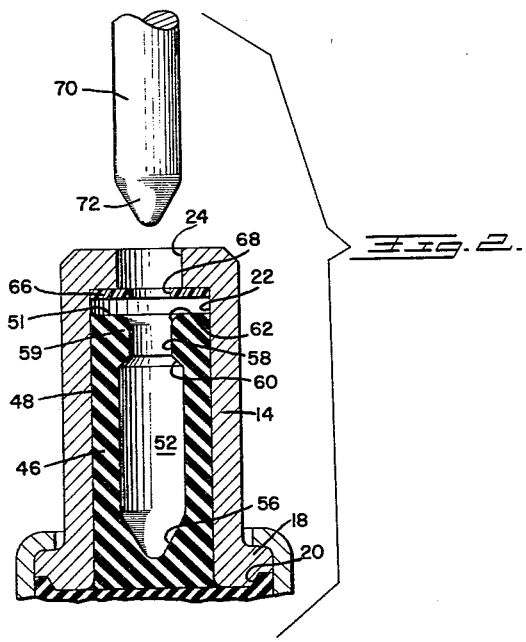

3,046,787
FUSION TYPE THERMAL ELEMENT
Joseph P. Wagner, Knoxville, Tenn., assignor to Robertshaw-Fulton Controls Company, Richmond, Va., a corporation of Delaware
Filed Oct. 6, 1958, Ser. No. 765,523
2 Claims. (Cl. 73—368.3)

This invention relates to new and useful improvements in fusion type thermal elements. In general, an element of this type is provided with a fusion type charge which expands and contracts in response to temperature changes and actuates a flexible diaphragm. The diaphragm, in turn, actuates a resilient member to cause movement of an actuating stem in response to changes in the temperature of the charge. The charge is normally effective only to cause an extension of the stem from the thermal element. A return spring is ordinarily provided to move the stem back into the element upon subsequent contraction of the charge.

In same applications, the thermal element is immersed in a liquid and is calibrated to actuate a mechanism, such as a valve poppet, at a predetermined control temperature. In the past, many cases have occurred in which liquid has become entrapped within the thermal element and affected the original calibration.

Accordingly, it is an object of this invention to prevent fluid from leaking into the interior of the thermal element.

Another object of this invention is to prevent fluid from leaking into the interior of the element and becoming entrapped between the actuating stem and the resilient member which actuates the stem.

Another object is to prevent fluid from leaking into the interior and becoming entrapped between the diaphragm and the resilient member actuated thereby.

Briefly stated, in the preferred embodiment of this invention, a resilient member is formed with a hollow interior within which an actuating stem is disposed. Near the open end of the interior, a ridge is formed so that when the stem is inserted therein, the ridge is pressed tightly between the stem and the casing to form two seals. The first seal is between the stem and the resilient member; the second seal is between the resilient member and the casing.

Other objects and advantages of this invention will be apparent from the following description taken in connection with the drawings wherein:

FIG. 1 is a partial longitudinal cross-sectional view of an embodiment of this invention; and FIG. 2 is another partial longitudinal cross-sectional view of the device of FIG. 1.

Referring now more particularly to the drawing, a fusion type thermal element, indicated generally by the reference numeral 10, is provided with a casing 12 comprising casing members 14 and 16. Casing member 14 is formed with an annular flange 18 at one end thereof having an annular groove 20 formed in the outer end face and extending to the periphery thereof. A cylindrical bore 22 extends from the flanged end 18 longitudinally through casing member 14 for a portion of the length thereof and terminates in a reduced axial aperture 24 at the opposite end.

Casing member 16 is generally cup-shaped having an inner cylindrical side wall 26, which extends between a bottom wall 28 at one end thereof and a counterbore 30 at the opposite end which defines an annular shoulder 32. An annular sealing ring 34, formed with a central orifice 36 therein, is seated upon shoulder 32 and underlies a flexible diaphragm 38 of rubber or other resilient material. Diaphragm 38 is formed with an annular collar 40 about the outer periphery thereof which extends into groove 20. An end wall 42 of the counterbore 30 of casing member 16 extends beyond the flange 18 of casing member 12 and is crimped or otherwise deformed so as to overlie flange 18. This serves to form a tight seal between the diaphragm 38 and casing member 16.

A charge of any conventional expansible-contractible fusion type substance 44 is disposed within the hollow area bounded by the walls 26, 28 of casing member 16 and the diaphragm 38 and sealing ring 34. The charge 44 is selected dependent upon the desired operating range of temperatures to which the thermal element 10 is to be applied.

A cylindrical member 46 of rubber or other resilient material fits closely within cylindrical bore 22 of casing 12 and extends from flange 18 to terminate in an end wall 51 adjacent the opposite end of casing member 14. Member 46 is provided with an axial bore 52 intermediate the ends thereof which terminates at one end in a conical section 56 and at the other end in an inwardly tapered section 60. A reduced axial aperture 58 of smaller diameter than aperture 24 extends from tapered section 60 through end wall 51 where a rounded edge 62 is provided. Thus an annular projection or ridge 59 is formed at the entrance of the bore 52 for a purpose apparent hereinafter.

An annular scraper ring 66 is disposed between end wall 51 and the interior of the end wall of casing member 14 and is provided with a central aperture 68 therethrough of similar diameter as aperture 58 in member 46. It should be noted that the axis of bore 52, aperture 58, aperture 68, and aperture 24 are in substantial alignment. Scraper ring 66 is preferably formed of a plastic material, such as Teflon.

An actuating stem 70, comprising a generally cylindrical rod, is adapted to fit closely within bore 52 and is formed with a conical section 72 at one end of substantially the same configuration as the conical section 56. The length of cylindrical member 46 in an unstressed condition, as best shown in FIG. 2, is less than the distance between the upper surface of diaphragm 38 and the lower surface of scraper ring 66.

When the stem 70 is inserted into bore 52, ridge 59 is pressed against bore 22. This pressure forces the unconfined material of end wall 51 to move upwardly into contact with the undersurface of scraper ring 66 which, because the diameter of aperture 68 is slightly less than the outer diameter of stem 70, is bent inwardly and downwardly as shown in FIG. 1.

The compressive forces between casing 12, resilient member 46 and stem 70 cause the resilient material to form two fluid-tight seals, one of which is formed between cylindrical member 46 and the wall of bore 22 and the other of which is formed between stem 70 and member 46. It will be obvious that to achieve such fluid seals, the diameters of bore 22, aperture 58 and stem 70 are fairly critical and that it is necessary to form aperture 58 with a diameter sufficiently less than that of stem 70 so that the material will be subject to sufficient pressure to effect the necessary seal.

Although the shapes of bores 22, stem 70 and member 46 have been described as circular in cross-section, the invention is not limited thereto and can be readily applied to articles having other cross-sectional shapes, such as triangular, rectangular, etc. The critical factor is forming the resilient member 46 with sufficient material in ridge 59 to be confined between the stem 70 and the casing to form the fluid-tight seal.

It is understood that changes may be made in the combination and arrangement of parts and the details of construction within the scope of the appended claims without departing from the scope of the invention disclosed herein.

I claim:

1. A fusion type thermal element comprising a hollow casing, a fusion type charge disposed within one portion of said casing, a diaphragm in the interior of said casing enclosing said fusion type charge and movable in response to expansion and contraction of said charge, a second substantially cylindrical portion of said casing formed with a bore extending from said diaphragm to a shoulder forming an opening of reduced diameter in the end of the bore, a substantially cylindrical member of rubberlike material fitted within said second portion having a closed end in engagement with said diaphragm and an open end spaced from said shoulder formed with a bore extending from said closed end having a diameter substantially the same as the diameter of an actuating stem to be slidably positioned in said bore, and an annular ridge projecting inwardly from said open end of said member forming an opening having a diameter smaller than the stem so that said ridge is deformed by insertion of the stem and pressed into engagement with said shoulder to form a seal.

2. A fusion type thermal element comprising a hollow casing, a fusion type charge disposed within one portion of said casing, a diaphragm in the interior of said casing enclosing said charge and being movable in response to expansion and contraction of said charge, a second portion of said casing extending from said diaphragm having an end wall with an opening therein forming a shoulder, a resilient member in said second portion of the casing having one end in engagement with said diaphragm and the other end extending toward said shoulder but normally spaced therefrom, a cylindrical bore formed in said resilient member, an annular ridge projecting inwardly from said bore at the end thereof adjacent said other end, and an actuating stem slidable in said bore having a diameter substantially equal to the diameter of said bore and radially compressing said annular ridge forcing the material thereof into engagement with said shoulder to form a seal.

References Cited in the file of this patent
UNITED STATES PATENTS

| | | |
|---|---|---|
| 1,427,811 | Heeter | Sept. 5, 1922 |
| 2,208,149 | Vernet | July 16, 1940 |
| 2,310,519 | Eskin | Feb. 9, 1943 |
| 2,806,376 | Wood | Sept. 17, 1957 |
| 2,907,596 | Mahu | Oct. 6, 1959 |
| 2,917,925 | Branson | Dec. 22, 1959 |